ized as a corporation of Michigan.

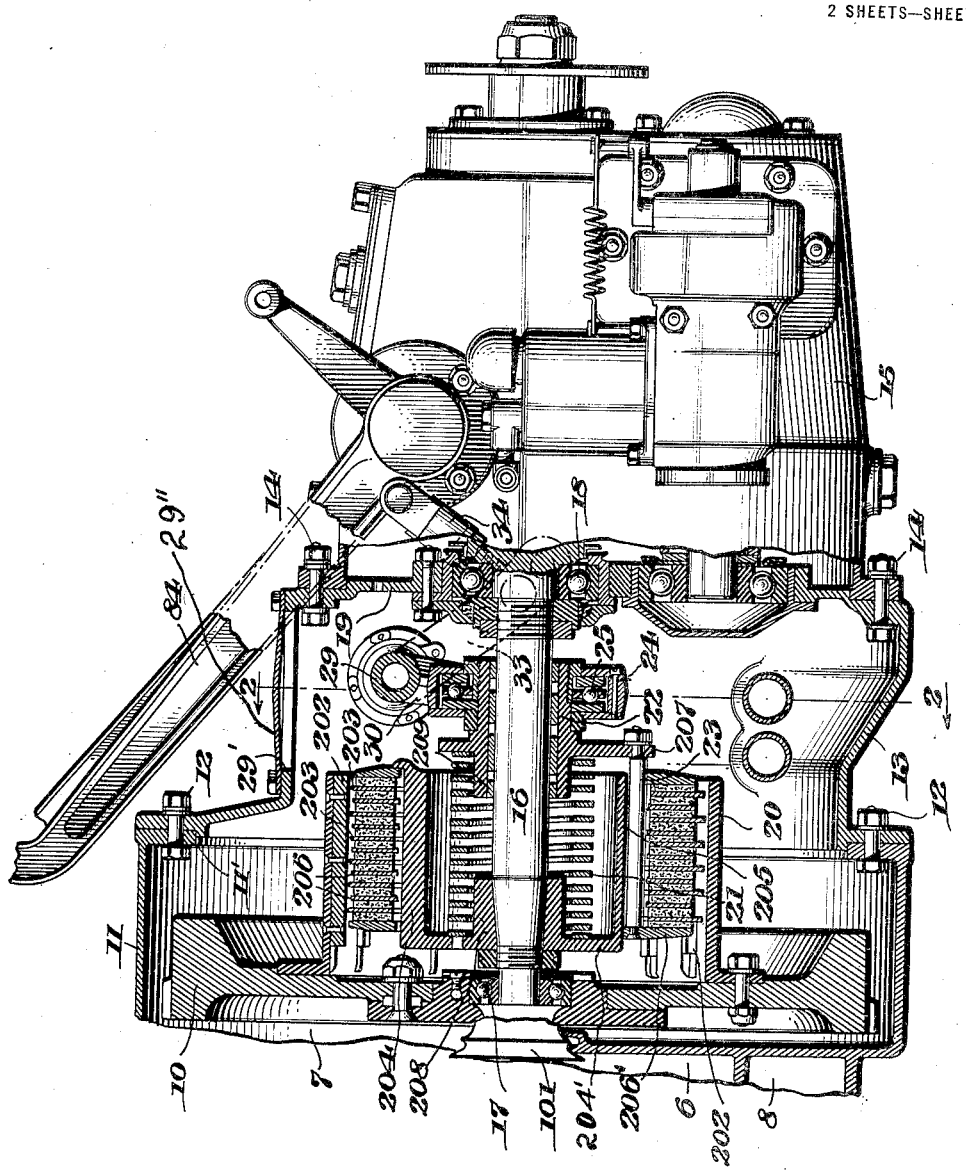

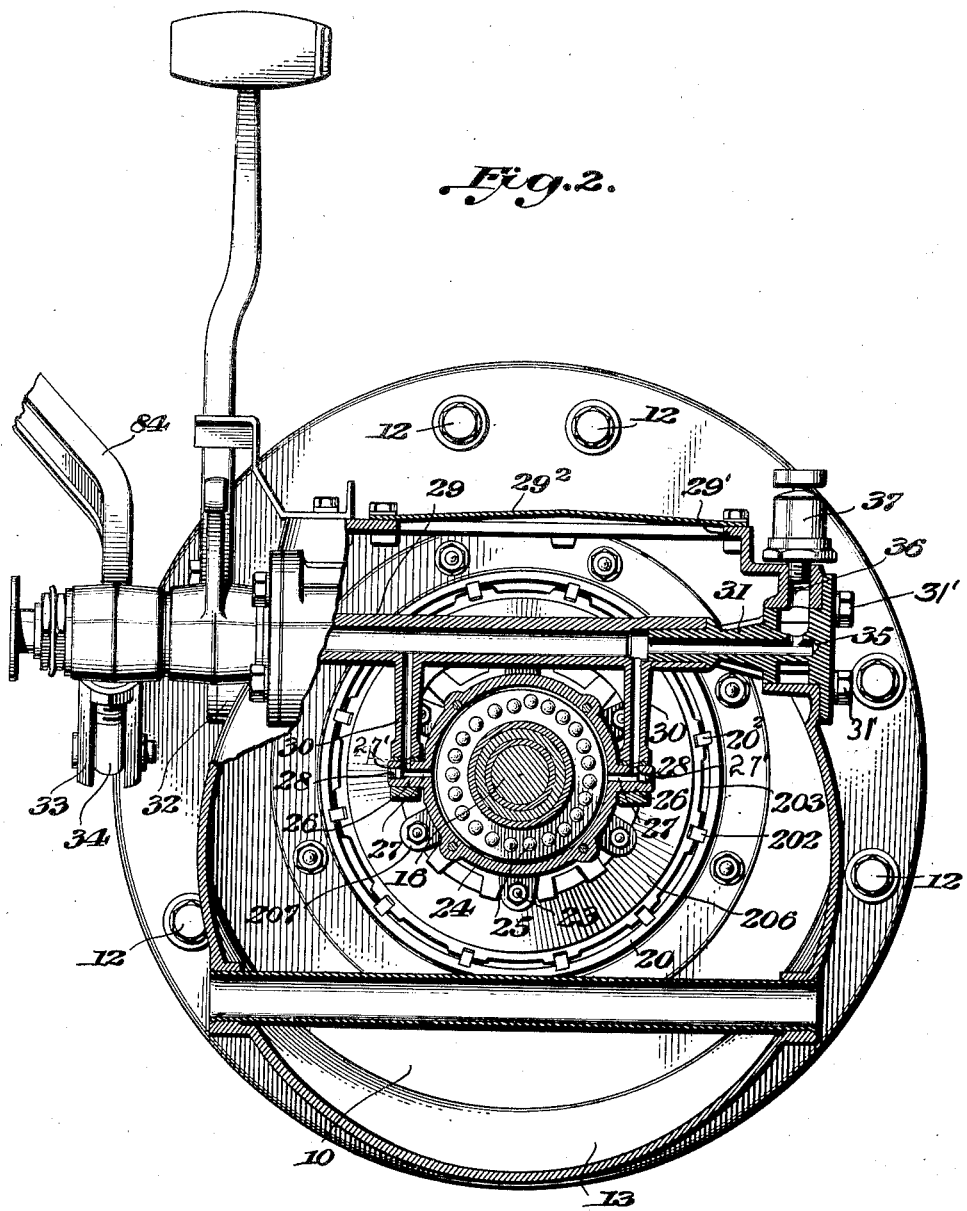

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

CLUTCH.

1,393,056.  Specification of Letters Patent.  Patented Oct. 11, 1921.

Original application filed January 31, 1916, Serial No. 75,414. Divided and this application filed November 27, 1918. Serial No. 264,437.

*To all whom it may concern:*

Be it known that I, JESSE G. VINCENT, a citizen of the United States, residing at Detroit, county of Wayne, State of Michigan, have invented certain new and useful Improvements in Clutches, of which the following is a specification.

This application which is a division of my application No. 75,414 filed January 31, 1916, relates to motor vehicles and more particularly to the clutch mechanism therefor.

The principal objects of the invention are to provide a means for lubricating a clutch yoke or collar operable from the outside of the clutch casing and also to provide a novel arrangement of clutch engaging spring which permits the use of a long spring of large diameter. Other objects and features of novelty will be apparent from the description taken in connection with the drawings, in which—

Figure 1 is a longitudinal sectional elevation through a clutch and casing embodying the present invention, the attached transmission casing being shown in elevation; and Fig. 2 is a sectional elevation taken substantially on the line 2—2 of Fig. 1, the operating pedals and their mounting being shown in elevation.

Referring to the drawings the rear part of the vehicle motor is shown at 6, the crank case thereof being in upper and lower detachable halves 7 and 8 and having a rearwardly extending part 11 which forms a housing for the motor flywheel for the motor 10. The rear end of said part 11 is open and is formed with a flange 11' to which is detachably secured, as by means of bolts 12, a catch casing 13. This casing is formed with an open front end and with a bearing supporting rear end or wall 19 and to this wall is detachably secured as by means of bolts 14 a gear or transmission casing 15. The inclosing part 11 of the crank case surrounds the flywheel and it also surrounds the forward part of a clutch which is mounted upon the flywheel and which extends rearwardly therefrom being disposed within the clutch casing 13.

As shown the clutch comprises an outer drum or casing 20 secured to the flywheel 10 and provided with keys 202 upon which slide a series of plates or disks 203. The inner drum or spider 204 of the clutch is mounted on the driven shaft 16 which has a front bearing 17 in the crank shaft 101 and a rear bearing 18 in the wall 19 of the clutch casing. The drum 204 has a series of longitudinal grooves 205 in which rods 23 may slide and form keys for a second and alternating series of plates or disks 206. A sleeve 22 is slidably mounted on the shaft 16 and has a flange 207 through which the rear ends of the rods 23 are secured. The forward ends of these rods are connected to a front plate 206' of said latter series of disks, so that the sliding movement of the sleeve 22 draws the clutch parts together or separates them. For the purpose of yieldingly holding the disks in engagement, a spring 21 is provided. As shown, this spring acts between the web or plate 204' of the drum 204 and the flange 207 of the sleeve 22, bosses or hubs 208 and 209 on the drum and sleeve respectively, serving to center and position the spring. It will be observed that this arrangement and construction permits the use of a clutch spring of larger diameter and of greater length than if it were positioned directly on the shaft 16 between the hubs 208 and 209. Consequently, because of this increased length of the spring, unit deformation or strain is reduced with the result that the spring has a longer life than in constructions heretofore provided.

For the purpose of actuating the sleeve 22 a collar 24 is provided and between this collar and the sleeve there is a thrust bearing 25. The collar 24 has trunnions 26 on opposite sides thereof and these trunnions are preferably provided with passages 27 to convey lubricant to the bearing 25. The outer ends of the passages 27 are closed by plugs 28. For the purpose of sliding the collar 24 longitudinally on the shaft, a tubular rock shaft 29 has hollow outwardly projecting arms 30, the lower ends of which engage with the trunnions 26 the interior of said arms communicating with the bores 27 through the passages 27'. One end of the shaft 29 is mounted on the tubular stub shaft 31 and the opposite end projects through the bearing member 32 and has secured thereon the arm 33 with which an adjustable actuating link 34 is connected, whereby the shaft 29 may be rocked to shift the sleeve 22 when the clutch pedal 84 is actuated, the upper end of link 34 being connected to this pedal. The stub shaft 31 is mounted in the wall of the casing 13 for removal laterally therefrom, the shaft being held in position by any suitable means such as the bolts 31'. Above the shaft 29 the casing 13 is provided with a relatively large opening 29' through which the shaft 29 may be removed when detached from the parts 31 and 32 and the trunnions 26. The opening 29' is normally closed by a cover plate 29''. A passage 35 in the stub shaft 31 communicates with a passage 36 in the wall of the casing and lubricant may be supplied to the latter passage in any suitable manner, as by means of the cup 37. From an inspection of Fig. 2, it is apparent that the lubricant will pass from the cup 27 through the passages 36 and 35 and the arms 30 to the ducts 27 in the trunnions and thence to the roller bearing 25. In this manner the clutch yoke or collar may be lubricated from means disposed outside of the clutch casing.

Although the structure for lubricating the collar has been described in connection with a multiple disk clutch, it is to be understood that this lubricating feature is not limited to this type of clutch, but may be employed in connection with any clutch constructions having a yoke or collar.

Having thus described my invention what is claimed as new and desired to be secured by Letters Patent is:—

1. In mechanism of the class described, the combination of a driving member, a driven member, a clutch adapted to form an operative connection between said members, a shiftable collar for actuating said clutch and provided with oppositely arranged tubular trunnions, a tubular shaft having tubular arms which are connected with said trunnions and form communicating passages between said shaft and trunnions, and means for supplying lubricant to the interior of said shaft.

2. In mechanism of the class described, the combination of a driving member, a driven member, a clutch arranged to form an operative connection between said members, a shiftable element connected with said clutch for actuating the same, a collar arranged on said element and provided with opposite tubular trunnions, a thrust bearing between said collar and said element whereby the latter may be actuated by the collar, a tubular shaft having tubular arms which are connected with said trunnions and through which lubricant may pass from the interior of the shaft to said trunnions and thence to said thrust bearing, bearings for supporting said shaft, and means for supplying lubricant to said shaft.

3. In mechanism of the class described, the combination of a casing, a clutch arranged therein and having a shiftable actuating element, a collar surrounding said element and having opposite tubular trunnions, a thrust bearing between said collar and said element, a hollow stub shaft secured to said casing, a tubular shaft having one end supported on said stub shaft and the opposite end supported in the casing opposite said stub shaft, said tubular shaft having tubular arms which are connected with said trunnions whereby lubricant may flow from the interior of the tubular shaft through said trunnions to said thrust bearing, and means upon said casing for supplying lubricant to said tubular shaft through said stub shaft.

4. In mechanism of the class described, the combination of a casing having an opening in the top thereof, a clutch arranged in said casing, a shiftable member for actuating said clutch, a shaft arranged transversely of the casing below the said opening therein and operatively connected with said shiftable member, a stub shaft projecting through one of the walls of the casing and on which one end of the first mentioned shaft is supported, said stub shaft being outwardly removable in the direction of the axis of the first mentioned shaft, the parts being so constructed and arranged that the first mentioned shaft may be removed through said opening when the stub shaft is removed from the casing.

5. In a motor vehicle having a clutch and a casing surrounding the same, means to actuate the clutch including a collar, a rock shaft having arms engaging the collar, said shaft and arms disposed within the casing and provided with communicating lubricant passages for lubricating the collar, and means exteriorly of the casing to supply lubricant to the passage in said shaft.

6. In a motor vehicle having a clutch comprising driving and driven members and a casing surrounding the same, means to actuate the clutch including a shiftable element rotatable with one member of the clutch, and a rockable device engaging said element to shift the same, said device being constructed to conduct lubricant from outside the casing to lubricate the contacting surfaces of said device and element.

In testimony whereof I affix my signature.

JESSE G. VINCENT.